UNITED STATES PATENT OFFICE.

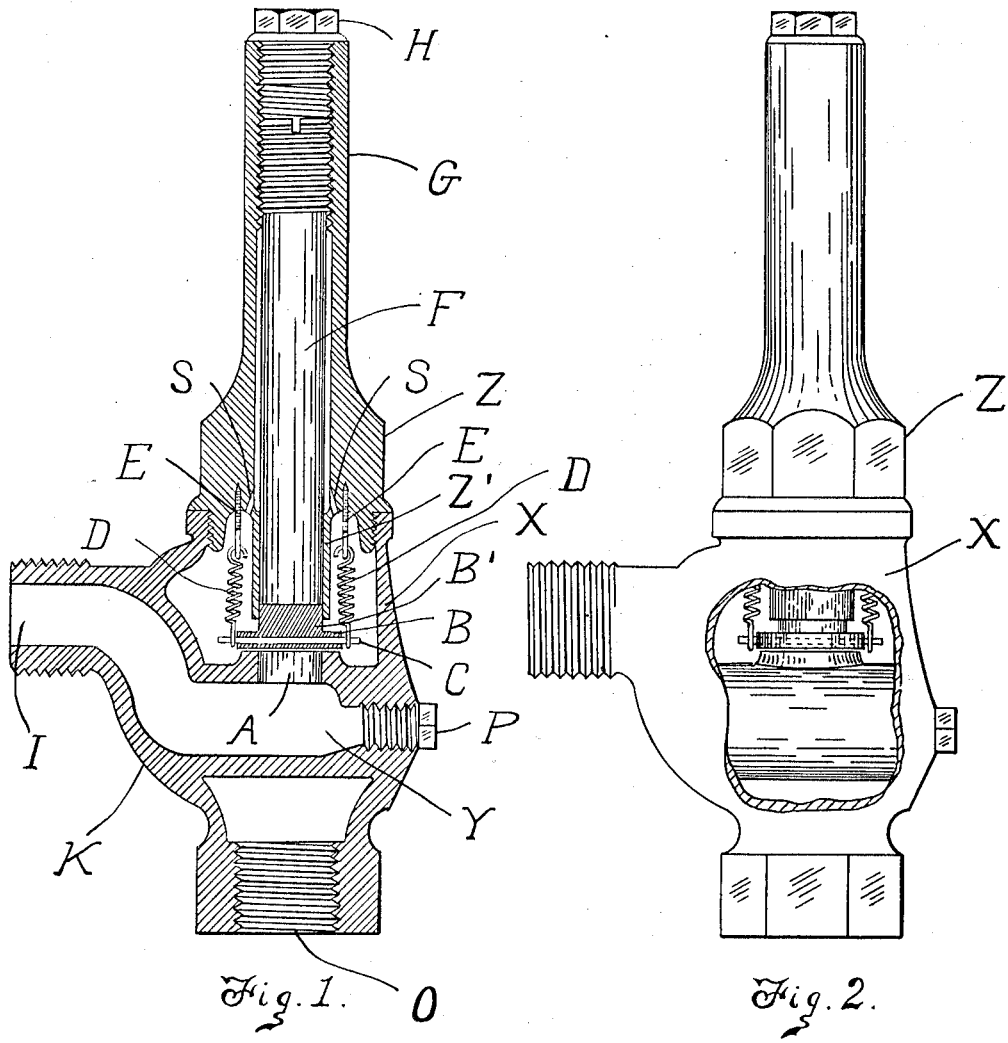

JOHN W. BARTON, OF CLEVELAND, OHIO.

THERMOSTATIC VALVE.

1,055,307. Specification of Letters Patent. Patented Mar. 11, 1913.

Application filed February 19, 1912. Serial No. 678,536.

*To all whom it may concern:*

Be it known that I, JOHN W. BARTON, a citizen of the United States, residing at Cleveland, in the county of Cuyahoga and State of Ohio, have invented certain new and useful Improvements in Thermostatic Valves, of which the following is a specification.

This invention relates to thermostatic valves, and has for its object to provide an improved valve of that type, especially adapted for use on radiators or heating systems, to permit the exhaust of condensation under any pressure.

The arrangement is such that the expansion member is subject to the temperature of vapor or exhaust after the same passes through the valve, in other words, no steam can reach the expansion member until it has first passed the valve, and when this occurs the valve will close in consequence of the operation of the expansion rod.

The invention is illustrated in the accompanying drawing in which—

Figure 1 is a section of the valve. Fig. 2 is a side elevation partly broken away.

Referring specifically to the drawing, the angular valve body X has an inlet at I and an outlet at O, the inlet communicating with a cylindrical passage or part Y which extends across the valve body and which has at its upper side the valve opening or seat A. This passage or part is depressed as shown at K, so that the seat is about on a level with the lower part of the inlet, and all condensation will collect in the depression K directly under the valve. A clean out plug P, at the end of said passage, permits cleaning of the valve without removing the bonnet which is indicated at Z and which is screwed into the top of the body.

The valve disk is indicated at B and has a cylindrical boss or projection B' on the top thereof. The valve opening communicates with the outlet through passages cored in the valve body on opposite sides of the part Y. The bonnet has a cylindrical part Z' which depends into the body and into the lower end of which the projection B' fits, thus forming a guide for the valve disk and acting to hold it in proper position.

The disk is supported normally in open position by means of springs D, connected to a rod C extending through the disk and to screw eyes E in the bonnet. The bonnet is extended to form a tube containing the expansion rod F which presses at its lower end against the valve disk, and which is threaded at its upper end for adjustment in the threaded part G of the tube.

H is a screw cap in the top of the tube. Port holes S are provided for the purpose of permitting steam to enter freely into tube which incloses expansion rod F.

Ordinarily, with the valve open, the water of condensation will flow through the valve opening and escape through the outlet. When steam begins to pass it will heat the parts of the valve structure above the valve seat and the heat being communicated to the rod F will expand the same, thereby pressing the disk against the seat and closing the valve, and it will remain closed until the condensation cools the expansible rod which will then contract, permitting the springs D to open the valve.

The valve disk may be readily renewed without disturbing the rod, by removing the bonnet and replacing the disk.

I claim:

1. A thermostatic valve comprising a body having an inlet and an outlet and a valve seat therebetween, a bonnet on the body, a valve member controlling the main passage through said valve and located on the outlet side of the valve seat and adapted to close against the seat, a spring connecting the bonnet and valve member and adapted to open the latter, and an expansible rod supported in the bonnet on the outlet side of the valve and bearing against the said member.

2. A thermostatic valve comprising a body having an inlet and an outlet and a cross passage communicating with said inlet, said cross passage being spaced from the sides of the body within the same and having a valve opening and seat at the top, said valve opening being below the level of the inlet, whereby condensation on the inlet side of the valve will collect in said passage, a bonnet on the valve body having a tubular extension, an expansion rod supported in said extension and located opposite to the valve seat, and on the outlet side thereof, a valve disk between the lower end of the expansion rod and the seat and adapted to be closed by said rod against the said seat, and springs connecting the disk to the bonnet and adapted to withdraw said disk from the valve seat when the expansion rod contracts.

In testimony whereof, I do affix my signature in presence of two witnesses.

JOHN W. BARTON.

Witnesses:
JOHN A. BOMMHARDT,
STEDMAN J. ROCKWELL.

Copies of this patent may be obtained for five cents each, by addressing the "Commissioner of Patents, Washington, D. C."